(12) United States Patent
Bershadsky

(10) Patent No.: US 6,648,125 B1
(45) Date of Patent: Nov. 18, 2003

(54) APPARATUS FOR EVENLY SPACING PACKAGES ON AN ASSEMBLY MACHINE

(75) Inventor: Boris Bershadsky, San Clemente, CA (US)

(73) Assignee: B E Design Automation, Inc., Anaheim, CA (US)

( * ) Notice: Subject to any disclaimer, the term of this patent is extended or adjusted under 35 U.S.C. 154(b) by 0 days.

(21) Appl. No.: 10/313,535

(22) Filed: Dec. 9, 2002

(51) Int. Cl.[7] ............................................... B65G 47/31
(52) U.S. Cl. ................ 198/460.1; 198/459.8; 198/461.1
(58) Field of Search .......................... 198/459.8, 460.1, 198/461.1, 461.2, 461.3

(56) References Cited

U.S. PATENT DOCUMENTS

| | | | | |
|---|---|---|---|---|
| 3,872,964 A | * | 3/1975 | Higgins | 198/460.1 |
| 6,253,906 B1 | * | 7/2001 | Hall | 198/460.1 |
| 6,315,104 B1 | * | 11/2001 | Ebert | 198/460.1 |
| 6,460,683 B1 | * | 10/2002 | Pfeiffer | 198/460.1 |

* cited by examiner

Primary Examiner—James R. Bidwell
(74) Attorney, Agent, or Firm—Thomas I. Rozsa; Tony D. Chen

(57) ABSTRACT

An apparatus to enable products to be evenly spaced so that they can be loaded onto a collator or other receiving device on a packaging machine. The packages are caused to be placed on a chain conveyor belt which has a multiplicity of spinning rollers to cause linear movement of the package along the chain conveyor belt. A multiplicity of sensors which actuate a respective air driven cylinder to cause a friction plate to come in contact with a selected portion of rollers at a location of the package will cause the linear movement of the package to stop for a given period of time so that the package can be appropriately spaced from the packages ahead of it and the packages behind it on the conveyor.

7 Claims, 5 Drawing Sheets

APPARATUS FOR EVENLY SPACING PACKAGES ON AN ASSEMBLY MACHINE

BACKGROUND OF THE INVENTION

1. Field of the Invention

The present invention relates to the field of packaging machines. More particularly, the present invention relates to the field of conveyors which cause packages to be loaded onto a receiving station in an assembly machine.

2. Description of the Prior Art

In general, packages of products which arrive at an automatic packaging machine arrive in a random manner and are not equally spaced apart. Prior art devices have not adequately addressed the problem on arranging the packages to be evenly spaced on the conveyor belt for receipt by the next device on the packaging line such as a collator. Prior art devices which have attempted to cause the packages to be evenly spaced encounter problems of deceleration when the conveyor is stopped and acceleration when the conveyor is restarted which results in the packages not being properly evenly spaced. There is a significant need for a device which enables packages to be evenly spaced on a conveyor belt in packaging machines.

SUMMARY OF THE INVENTION

The present invention is an apparatus to enable products to be evenly spaced so that they can be loaded onto a collator or other receiving device on a packaging machine.

It has been discovered, according to the present invention, that if packages are caused to be placed on a chain conveyor belt which has a multiplicity of spinning rollers to cause linear movement of the package along the chain conveyor belt, then a multiplicity of sensors which actuate a respective air driven cylinder to cause a friction plate to come in contact with a selected portion of the rollers at a location of a package will cause the linear movement of the package to stop for a given period of time so that the package can be appropriately spaced from the packages ahead of it and the packages behind it on the conveyor.

It has also been discovered, according to the present invention, that if linear movement along a chain conveyor is caused by the rotation of a multiplicity of continuously rotating rollers and rotations of the rollers is stopped by a friction plate coming in contact with a certain portion of the rollers, then upon removal of the friction plate, the rollers will automatically cause linear movement of the object on the rollers to continue without appreciable acceleration.

It has further been discovered, according to the present invention, that if a friction plate is attached to rollers to cause them to spin more rapidly, the linear movement created by the rollers will increase.

It has also been discovered, according to the present invention, that if an in-feed belt conveyor delivers packages onto a chain drive roller assembly, it is necessary to cause the chain drive roller assembly to cause faster linear movement of a package at the location where the in-feed belt delivers the package to the chain drive roller to create a separation of the package from the next package on the in-feed belt conveyor.

It is therefore an object of the present invention to enable packages of products which arrive on an automatic packaging machine and arrive in a random manner and are not equally spaced apart to become equally spaced apart in order to enable packages to be evenly received by a collating machine or the next machine in the automatic packaging assembly machine.

It is also an object of the present invention to enable linear movement of the conveyor belt along which the package travels to be stopped with near zero deceleration and restarted with near zero acceleration.

It is an additional object of the present invention to provide a conveyor assembly with a multiplicity of sensors so that different packages can be stopped and started at different locations along the conveyor.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The problem identified by the present invention is that packages of products which arrive on an automatic packaging machine arrive in a random manner and are not equally spaced apart. In order to enable a collating machine which has evenly spaced stations to accept the incoming packages for placement in a container, the packages must be evenly spaced apart and traveling at the same rate of speed. It is therefore necessary through a system of sensors to detect the distance between incoming packages and if a second package is too close to a first package, cause the second package to be delayed until it is spaced apart from the first package by a desired amount.

Figure 1:
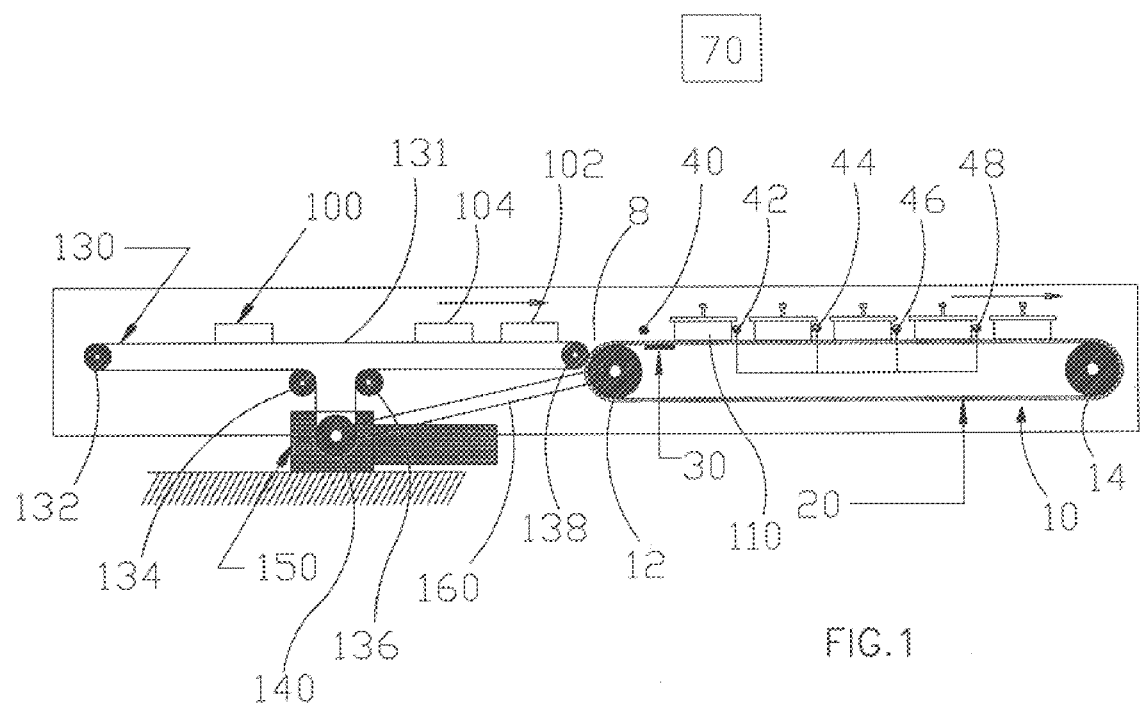
FIG. 1 is a side elevational representational view of an in-feed belt conveyor and the present invention roller chain conveyor belt having a multiplicity of sensor locations with associated roller stopping means.

Referring to FIGS. 1 through 5, the subject packages such as 100 illustrated in FIG. 1 arise from a previous assembly station such as a freezer or production assembly machine and arrive in a random manner so that some are spaced far from an adjacent package and some are spaced close together as illustrated on the left portion of FIG. 1. The packages 100, 102 and 104 arrive and are moved onto an in-feed belt conveyor 130. The in-feed belt conveyor 130 is caused to move in a linear direction by means of a multiplicity of belt rollers 132, 134, 136, 138 and a drive roller 140. A drive mechanism 150 causes the drive roller 140 to rotate which in turn causes the belt rollers 132, 134, 136 and 138 to rotate which in turn causes the belt 130 to move in a linear direction. As illustrated in FIG. 1, there are three packages on the belt conveyor, a first package 102 at the front, a second package 104 closely behind it, and a third package 100 separated from the second package by a distance greater than the separation between the first package 102 and the second package 104.

The present invention respacing and collating system involves a chain conveyor 10 which is aligned with the belt conveyor 130 and designed to receive packages and cause them to be equally spaced apart on the chain conveyor so that packages can be readily accepted by a collating machine. The chain conveyor 10 has a hollow pin chain 20 on which the incoming packages are moved from the belt 131 of in-feed belt conveyor 130. The chain 20 set within guide 22 is driven by a multiplicity of rollers of which two, lead roller 12 and a rear roller 14 are illustrated in FIG. 1. A timing belt 160 interconnects the drive roller 140 and the lead roller 12 so that the drive mechanism causes both rollers to rotate. The linear velocity of the top surface of the roller is equal to the angular speed of the roller times the radius of the roller. The drive roller 140 and the lead roller 12 are sized so that the speed of the drive chain 20 is approximately 10 to 15 percent faster than the speed of the belt 131 of the belt conveyor 130.

The roller chain conveyor 10 has on the very beginning of the roller chain conveyor a permanently located bar 30 with high friction material touching the roller from the inside. Rollers 60 on the pin installed into the hollow chain conveyor 10 provide a free spinning condition of the rollers. When the high friction bar 30 touches the conveyor rollers 60 it causes the rollers 60 to move with double the speed of the moving chain. This is located at the front end of the conveyor 10 at the location where packages are transferred from the belt conveyor 130 to the chain conveyor 10. A lead sensor 40 is also located at the front end of the belt conveyor 10. If incoming products come onto the front section of the roller chain conveyor, the initial product separates from other products on the in-feed belt conveyor due to faster speed at the front end of the chain conveyor 10 and the lead sensor 40 would see one product at a time. The sensor can see separated products and the next product could be just behind or come some time later. If the two products are not just behind each other, the products would be conveyed forward but the sensor 40 would know which is first, second, third, etc. Because some of the products are far behind and some closer, the sensor 40 would time random separation.

As illustrated in FIG. 1, located along the chain conveyor 10 are a multiplicity of evenly spaced sensors 42, 44, 46 and 48. When the first product 110 is moved onto the conveyor roller 10, it is registered, and it will move along the conveyor chain 10 onto a position when the next sensor 42 on the first stop position would register that the product 110 has arrived and the next product would be timed to be evenly separated from it. The products have to be separated by a given time between products needed for the next machine to accept incoming products. For example, if the next machine such as a collator runs with 0.500 seconds between branches where a product has to go, and if the separation between products is less than 0.500 seconds, the first product 110 would be stopped by the second sensor 42 of the roller chain conveyor. The second sensor 42 would cause a product to stop at 180 degree rotation.

Figure 2:
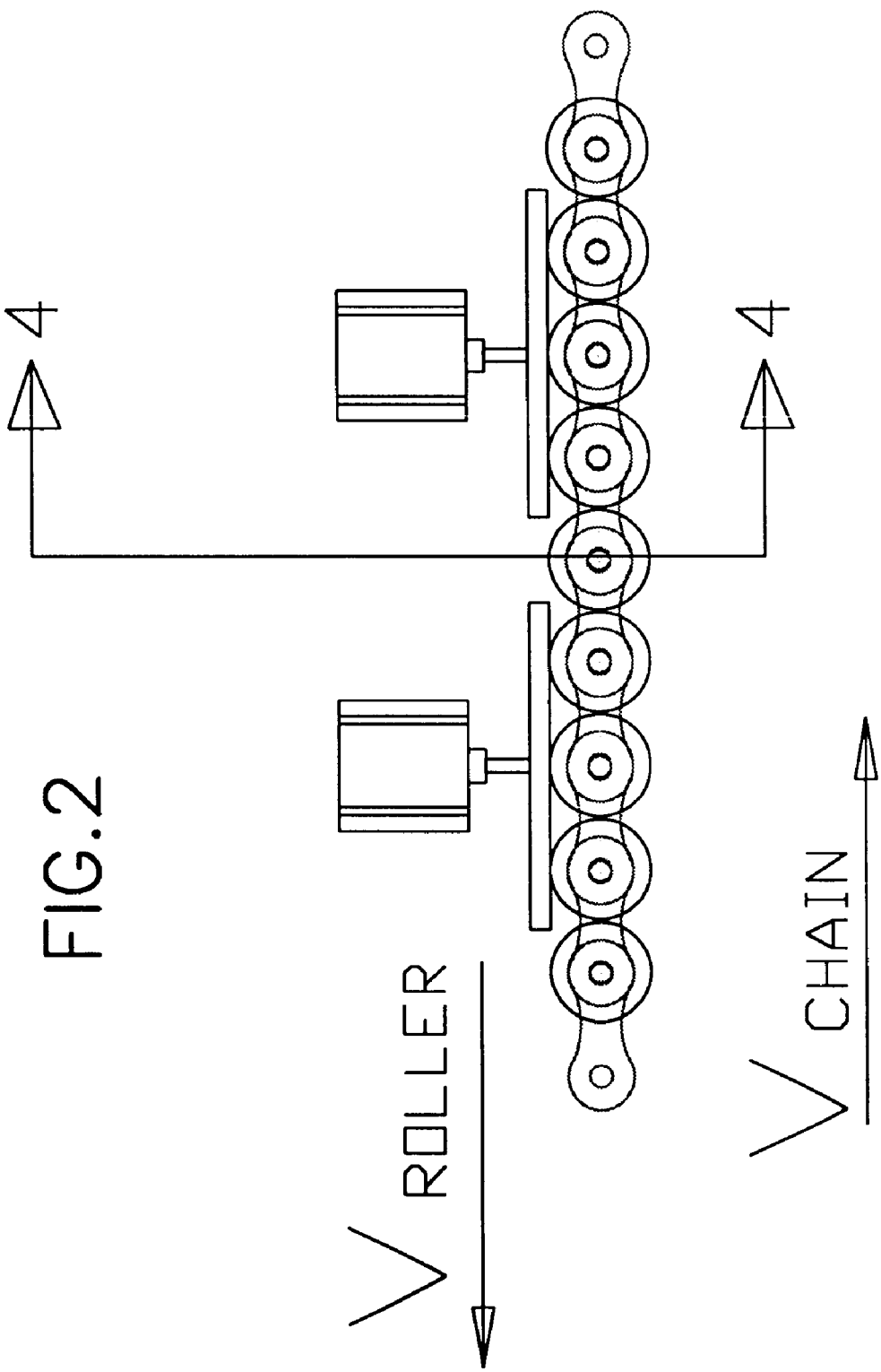
FIG. 2 is a side representational view of the rollers of the roller chain conveyor belt with air cylinders causing friction plates to come in contact with the rollers.
Figure 3:
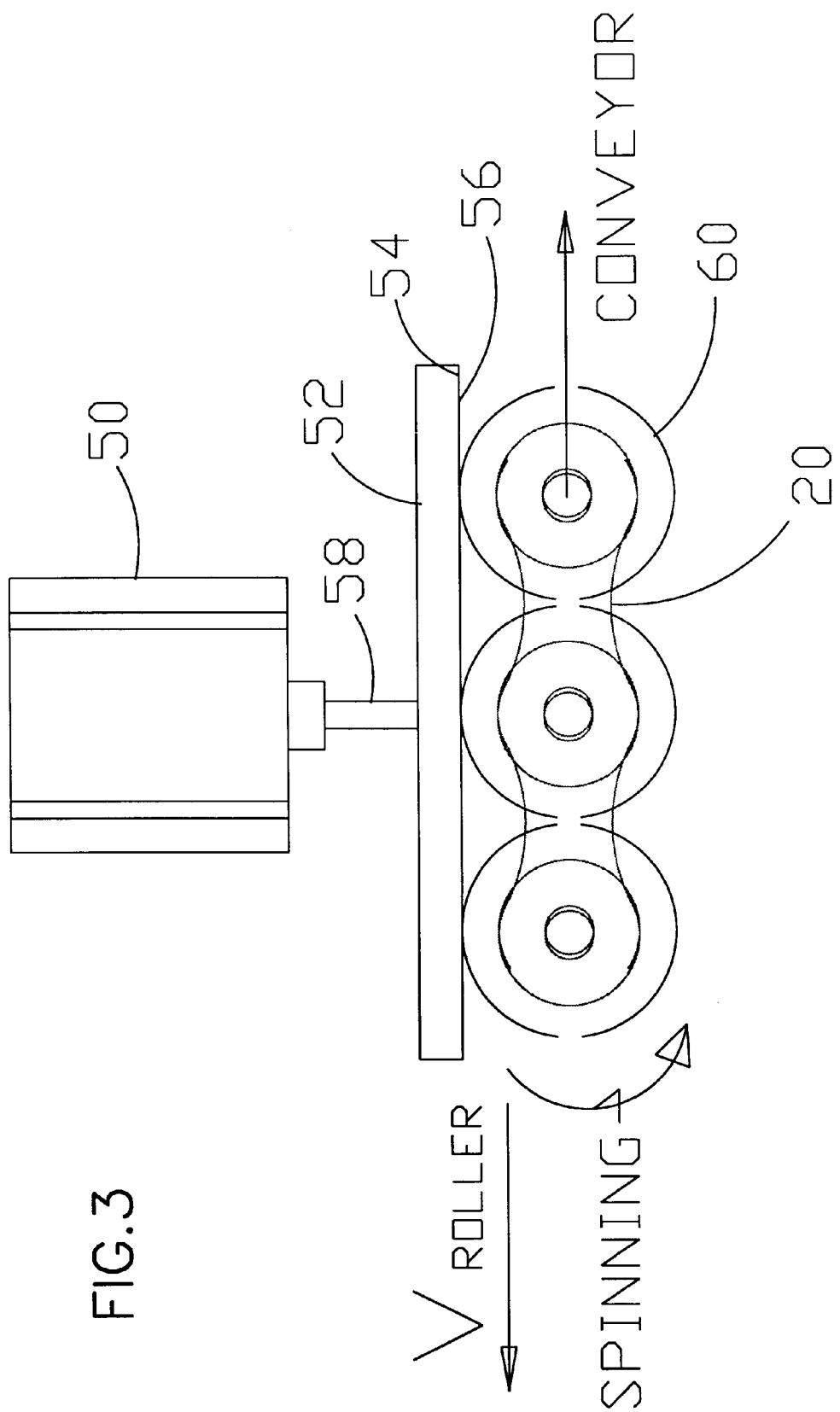
FIG. 3 is a illustrative view of an air cylinder causing a friction plate to come in contact with rollers of the roller chain conveyor belt to cause the rollers to spin freely and not continue linear motion.
Figure 4:
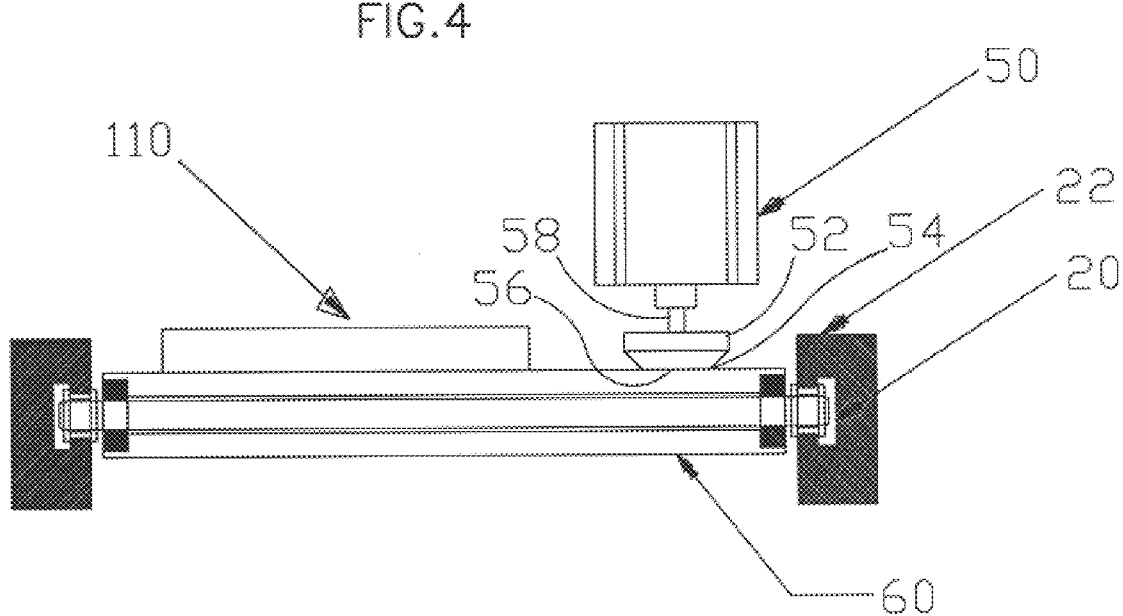
FIG. 4 is a cross-sectional view taken along Line 4—4 of FIG. 2.
Figure 5:
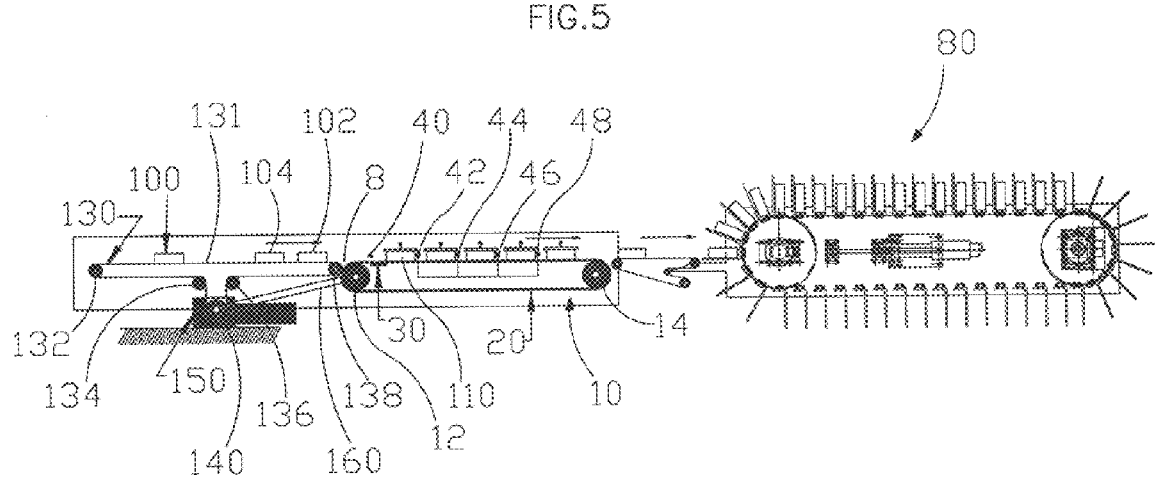
FIG. 5 is a side elevational representational view of the in-feed belt conveyor and the present invention roller chain conveyor belt illustrated in FIG. 1, along with a collator to receive evenly spaced packages.

A key innovation of the present invention is a method by which the conveyor chain 10 is caused to stop linear movement of the package 110. The present invention involves an air cylinder 50 which is attached through an air shaft 58 to a horizontal plate 52 having high friction material 56 attached to the lower surface 54 of the horizontal plate 52. While an air cylinder is discussed and illustrated, any roller stopping means which could include a stepper motor to actuate the friction plate or a hydraulic device to actuate the friction plate are all within the spirit and scope of the present invention. When activated by the sensor which signals a logic control 70 to activate an air cylinder, the air cylinder 50 creates a downward force to cause the lower high friction material 56 to touch the rollers 60 which cause the linear movement of the packages such as 110 along the chain conveyor 10. Ordinarily, the linear velocity of the top surface of the rollers 60 is equal to the angular speed of the roller times the radius of the roller. The linear velocity of the chain is equal to the linear velocity of the top surfaces of the roller and this equals the traveling speed of the product. Without the friction touching the chain, the rollers cause the chain to move linearly and conveys the product on the roller in the direction of the chain 20, as illustrated in FIG. 3. When the air cylinder 50 causes the frictional surface 56 of the plate 52 to touch the rollers as illustrated in FIGS. 2, 3 and 4, the rollers 60 are caused to spin and they spin in the opposite direction of the linear movement as illustrated in FIG. 3. The touching causes the product movement to stop because the touching causes the rollers to spin in a direction which counteracts the linear movement of the rollers so during touching, the product movements stops. When the touching is released, the product begins to move with the speed of the chain conveyor so there is no delay and no acceleration as it starts to go immediately. Further, when the rollers are initially stopped to cause product stoppage, there is virtually no deceleration and once again, when the friction plate is removed from the rollers, the rollers start again with virtually no acceleration. Therefore, the even spacing of the products 110 is facilitated.

At the receiving end 8 of the chain belt conveyor 10, there is a product sensor 40 to register the incoming product and the sensor 40 advises the logical control 70 that a package is about to be discharged from the belt conveyor 130 and received by the chain conveyor 10. At the beginning of the chain conveyor 10 when the package is discharged from the belt conveyor 130 or onto the roller chain conveyor 10, the rollers 60 are caused to rotate in the same direction that the chain is moving so that the speed is doubled to create a separation between the product displaced onto the chain conveyor 10 from the rest of the product to be discharged from the in-feed belt conveyor 130. The rollers are constantly spinning at the beginning for the length of the product.

Product movement is controlled by logic control 70 which receives a signal from the sensors on the chain conveyor. The device causes the product to stop at a location by activating the air cylinder 50 to touch the rollers 60 with friction so this forces the product to stop moving. As illustrated in FIG. 1, there are a multiplicity of locations where product can be stopped at each location. The control 70 tells the air cylinder 50 when to stop the product.

At each sensor point, such as 42, 44, 46, and 48 illustrated in FIG. 1, the sensor senses the product and tells the machine logic control 70 to stop movement until the previous sensor senses the next product. There is an associated air cylinder 50 with its given friction plate 52 associated with each sensor so that upon a given signal, the air cylinder causes its friction plate to come into contact with the rollers 60 at the location of a given sensor to cause movement to stop at that location so that the package movement stops until a next signal is provided by that sensor to tell the logic control to cause the air cylinder to remove the friction plate from the rollers so that virtually no acceleration can continue so that the appropriate separation between packages as located between the different sensors 42, 44, 46 and 48 can be achieved. Each sensor registers and counts how many products have passed. When the distance between the next product and the previously passed product is insufficient, the given sensor tells the logic control to activate activates the air cylinder to cause the second product to stop so that the appropriate spacing between products is created before the sensor signals the logic control to cause the air cylinder to release the friction force and permit the rollers to continue to move the package once again.

There is at least one air cylinder and plate with a friction surface at the location of each sensor so that movement of a given package can be stopped at any desired sensor location in order to create the desired even spacing between packages. Therefore, the key innovation of the present invention is to have a multiplicity of air cylinders and friction plates at desired sensor locations along the length of the conveyor chain so that packages at a given location can be stopped for any desired length of time to facilitate even spacing to stop product on the roller chain conveyor without touching the product. The air cylinder is actuated to cause the friction plate to go down and all rollers under the plate would start spinning and the linear speed of the top rollers would be equal to the linear speed of the chain of the roller chain conveyor. The absolute speed of the product would be zero. All rollers have the same outside diameter so the linear speed of the rollers is the same.

As soon as the third product arrives and the accumulated time between the first, second and third is less than the first moved to the third position, the second product is moved to go to the second position and the third product is at the first position. If the time is for example more than 0.500 seconds, the first product would have to be released and the second product would go onto the second position and when the third product would arrive, it would go onto the first position. There could be five or seven positions of the stopping plates and sensors, or there could be even more for high speed operations of over 400 parts per minute. Therefore, the main conveyor is running constantly and through use of the air cylinders with the friction plates causing a stoppage of the movement at any desired location, the products could be evenly spaced from sensor to sensor with each sensor through the control means telling the air cylinder how long it is to cause the rollers to stop and stop movement of the package.

A significant benefit of the present invention is that after a stoppage by the plate contacting the rollers, once the plate is removed, the conveyor starts to move the package again with practically zero acceleration speed on the conveyor. Therefore, the spacing that was desired to be achieved will be maintained.

The present invention was tested with the following packages: (1) bags containing flour, cereal, candies, cookies etc.; (2) pouches containing plastic parts, cocoa mix, coffee, etc.; (3) burritos and tortillas; (4) flat plastic parts; (5) chicken patties etc.

In addition, products spaced and timed could be to different conditions for operation. (1) release first coming toward collator or bucket of continuously running apparatus by the cycle time from the machine or collator accepting products; (2) spaced time equally and release into collator or machine by a given time.

The first system is on demand. The second system is slaved to a specific mechanism. Each of the systems has different controls for operation but the design hardware is the same and the system is provided with two controls. By selection, each one would be working as a final product. In the figures, the first system is illustrated. Product is released on the chain belt conveyor delivering perfectly timed product to the accepting product bucket. Buckets of the collator 80 give the signal when the first product should be released. If the product respacing conveyor 80 would be operated by a second system, each released product would go into the bucket of the collator 80 and the collator 80 would make a cycle and the next product would go to the next bucket. The product is spaced and timed such that enough time is adjusted to make the collator cycle. In this case, the collator would accept multiple counts as well as a single product.

Therefore, the key innovation of the present invention is an apparatus which enables packages to be evenly spaced comprising: (a) a conveyor means having a chain drive means which causes the conveyor to move in the linear direction and a multiplicity of rollers which normally rotate in the same direction as the chain to cause packages placed upon the rollers to move in the linear direction; (b) a multiplicity of sensors positioned along the conveyor means to sense the location of a respective package as the package comes into the sensing field of the given sensor; and (c) a multiplicity of air cylinders each respectively connected to a friction plate, a respective air cylinder and friction plate associated with a respective sensor, such that upon a first signal to a control apparatus from a given sensor means, the associated air cylinder causes its friction plate to come in contact with selected rollers at the location of the given sensor to cause the rollers to spin freely and stop linear movement of the selective package at the position of those rollers and upon a second signal from the given sensor means, the friction plate of the associated air cylinder is caused to move away from the given rollers to permit linear movement to continue with no appreciable acceleration, thereby enabling the package to be evenly spaced along the conveyor means.

Defined in detail, the present invention is an apparatus for a packaging machine which enables packages to be evenly spaced for receipt by a collator, comprising: (a) an in-feed belt conveyor which receives packages in a random manner and linearly transports the packages; (b) a chain conveyor means located to receive packages from the in-feed belt conveyor, the in-feed belt conveyor and the chain conveyor means run by the same timing chain driven by a drive means, such that the chain conveyor moves ten to fifteen percent faster than the in-feed belt conveyor; (c) the chain conveyor means having a chain drive means which causes the conveyor to move in the linear direction and a multiplicity of rollers which normally rotate in the same direction as the chain to cause packages placed upon the rollers to move in the same linear direction; (d) a multiplicity of sensors positioned along the conveyor means to sense the location of a respective package as the package comes into the sensing field of the given sensor; and (e) a multiplicity of air cylinders each respectively connected to a friction plate, a respective air cylinder and friction plate associated with a respective sensor, such that upon a first signal to a control apparatus from a given sensor means, the control apparatus causes the associated air cylinder to cause its friction plate to come in contact with selected rollers at the location of the given sensor to cause the rollers to spin freely and stop linear movement of the selective package at the position of those rollers and when the appropriate distance from the next successive package further along the conveyor has been sensed by another sensor, then upon a second signal to a control apparatus from the given sensor means, the friction plate of the associated air cylinder is caused to move away from the given rollers to permit linear movement of the package to continue with no appreciable acceleration, thereby enabling the packages to be evenly spaced along the conveyor means; and (f) a collator means positioned to receive evenly spaced packages from the conveyor means.

Defined broadly, the present invention is an apparatus for a packaging machine which enables packages to be evenly spaced, comprising: (a) an in-feed conveyor which receives packages in a random manner and transports the packages; (b) a chain conveyor means located to receive packages from the in-feed conveyor, the chain conveyor means moving faster than the in-feed conveyor; (c) the chain conveyor means having a chain drive means which causes the conveyor to move in a linear direction and a multiplicity of rollers which normally rotate in the same direction as the chain to cause packages placed upon the rollers to move in the same linear direction; (d) a multiplicity of sensors positioned along the chain conveyor means to sense the location of a respective package as the package comes into the sensing field of the given sensor; and (e) a multiplicity of roller stopping means, a respective roller stopping means associated with a respective sensor such that upon a first signal from a given sensor, the roller stopping means is activated to cause the stoppage of selected rollers which will stop linear movement of the selective package in the field of the given sensor and when an appropriate distance from the next successive package further along the conveyor has been sensed, then upon a second signal from the given sensor means, the roller stopping means releases the rollers to permit the linear movement of the package to continue, thereby enabling the packages to be evenly spaced along he conveyor.

Defined more broadly, the present invention is an apparatus which enables packages to be evenly spaced comprising: (a) a conveyor means having a chain drive means which causes the conveyor to move in the linear direction and a multiplicity of rollers which normally rotate in the same direction as the chain to cause packages placed upon the rollers to move in the same linear direction; and (b) a multiplicity of sensors positioned along the conveyor means to sense the location of a respective package as the package comes into the sensing field of the given sensor; and (c) a multiplicity of air cylinders each respectively connected to a friction plate, a respective air cylinder and friction plate associated with a respective sensor, such that upon a first signal to a control apparatus from a given sensor means, the control apparatus causes the associated air cylinder to cause its friction plate to come in contact with selected rollers at the location of the given sensor to cause the rollers to spin freely and stop linear movement of the selective package at the position of those rollers and upon a second signal to a control apparatus from the given sensor means, the friction plate of the associated air cylinder is caused to move away from the given rollers to permit linear movement to continue with no appreciable acceleration, thereby enabling the packages to be evenly spaced along the conveyor means.

Defined alternatively in detail, the present invention is an apparatus which enables packages to be evenly spaced comprising: (a) a conveyor means having a chain drive means which causes the conveyor to move in the linear direction and a multiplicity of rollers which normally rotate in the same direction as the chain to cause packages placed upon the rollers to move in the same linear direction; (b) a multiplicity of sensors positioned along the conveyor means to sense the location of a respective package as the package comes into the sensing field of the given sensor; and (c) a multiplicity of roller stopping means, a respective roller stopping means associated with a respective sensor such that upon a first signal from a given sensor, the roller stopping means is activated to cause the stoppage of selected rollers which will stop linear movement of the selective package in the field of the given sensor and when an appropriate distance from the next successive package further along the conveyor has been sensed, then upon a second signal from the given sensor means, the roller stopping means releases the rollers to permit the linear movement of the package to continue, thereby enabling the packages to be evenly spaced along the conveyor.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. An apparatus for a packaging machine which enables packages to be evenly spaced for receipt by a collator, comprising:

a. an in-feed belt conveyor which receives packages in a random manner and linearly transports the packages;

b. a chain conveyor means located to receive packages from the in-feed belt conveyor, the in-feed belt conveyor and the chain conveyor means run by the same timing chain driven by a drive means, such that the chain conveyor moves ten to fifteen percent faster than the in-feed belt conveyor;

c. the chain conveyor means having a chain drive means which causes the conveyor to move in the linear direction and a multiplicity of rollers which normally rotate in the same direction as the chain to cause packages placed upon the rollers to move in the same linear direction;

d. a multiplicity of sensors positioned along the conveyor means to sense the location of a respective package as the package comes into the sensing field of the given sensor; and e. a multiplicity of air cylinders each respectively connected to a friction plate, a respective air cylinder and friction plate associated with a respective sensor, such that upon a first signal to a control apparatus from a given sensor means, the control apparatus causes the associated air cylinder to cause its friction plate to come in contact with selected rollers at the location of the given sensor to cause the rollers to spin freely and stop linear movement of the selective package at the position of those rollers and when the appropriate distance from the next successive package further along the conveyor has been sensed by another sensor, then upon a second signal to a control apparatus from the given sensor means, the friction plate of the associated air cylinder is caused to move away from the given rollers to permit linear movement of the package to continue with no appreciable acceleration, thereby enabling the packages to be evenly spaced along the conveyor means; and f. collator means positioned to receive evenly spaced packages from the conveyor means.

2. The invention as defined in claim 1, wherein the speed of the chain conveyor moves twice as fast as the in-feed belt conveyor at the location where the chain conveyor receives packages from the in-feed belt conveyor to cause a separation of the package on the chain conveyor from the next package on the in-feed belt conveyor.

3. The invention as defined in claim 1, wherein said friction plate is attached to the air cylinder by an air shaft and the friction plate has a high friction material on its lower surface which comes in contact with the rollers.

4. An apparatus for a packaging machine which enables packages to be evenly spaced, comprising:

a. an in-feed conveyor which receives packages in a random manner and transports the packages;

b. a chain conveyor means located to receive packages from the in-feed conveyor, the chain conveyor means moving faster than the in-feed conveyor;

c. the chain conveyor means having a chain drive means which causes the conveyor to move in a linear direction and a multiplicity of rollers which normally rotate in the same direction as the chain to cause packages placed upon the rollers to move in the same linear direction;

d. a multiplicity of sensors positioned along the chain conveyor means to sense the location of a respective package as the package comes into the sensing field of the given sensor; and e. a multiplicity of roller stopping means, a respective roller stopping means associated with a respective sensor such that upon a first signal from a given sensor, the roller stopping means is activated to cause the stoppage of selected rollers which will stop linear movement of the selective package in the field of the given sensor and when an appropriate distance from the next successive package further along the conveyor has been sensed, then upon a second signal from the given sensor means, the roller stopping means releases the rollers to permit the linear movement of the package to continue, thereby enabling the packages to be evenly spaced along the conveyor.

5. The invention as defined in claim 4, further comprising a collator means to receive the evenly spaced package from the conveyor means.

6. An apparatus which enables packages to be evenly spaced comprising:

a. a conveyor means having a chain drive means which causes the conveyor to move in the linear direction and a multiplicity of rollers which normally rotate in the same direction as the chain to cause packages placed upon the rollers to move in the same linear direction; and b. a multiplicity of sensors positioned along the conveyor means to sense the location of a respective package as the package comes into the sensing field of the given sensor; and c. a multiplicity of air cylinders each respectively connected to a friction plate, a respective air cylinder and friction plate associated with a respective sensor, such that upon a first signal to a control apparatus from a given sensor means, the control apparatus causes the associated air cylinder to cause its friction plate to come in contact with selected rollers at the location of the given sensor to cause the rollers to spin freely and stop linear movement of the selective package at the position of those rollers and upon a second signal to a control apparatus from the given sensor means, the friction plate of the associated air cylinder is caused to move away from the given rollers to permit linear movement to continue with no appreciable acceleration, thereby enabling the packages to be evenly spaced along conveyor means.

7. An apparatus which enables packages to be evenly spaced comprising:

a. a conveyor means having a chain drive means which causes the conveyor to move in the linear direction and a multiplicity of rollers which normally rotate in the same direction as the chain to cause packages placed upon the rollers to move in the same linear direction;

b. a multiplicity of sensors positioned along the conveyor means to sense the location of a respective package as the package comes into the sensing field of the given sensor; and c. a multiplicity of roller stopping means, a respective roller stopping means associated with a respective sensor such that upon a first signal from a given sensor, the roller stopping means is activated to cause the stoppage of selected rollers which will stop linear movement of the selective package in the field of the given sensor and when an appropriate distance from the next successive package further along the conveyor has been sensed, then upon a second signal from the given sensor means, the roller stopping means releases the rollers to permit the linear movement of the package to continue, thereby enabling the packages to be evenly spaced along the conveyor.

\* \* \* \* \*